United States Patent
Shih

(10) Patent No.: US 11,921,741 B2
(45) Date of Patent: Mar. 5, 2024

(54) METHOD FOR ACCESSING REDFISH DATA VIA A UNIFIED EXTENSIBLE FIRMWARE INTERFACE APPLICATION

(71) Applicant: Jabil Circuit (Singapore) Pte. Ltd., Singapore (SG)

(72) Inventor: Fu-Pao Shih, Taichung (TW)

(73) Assignee: Jabil Circuit (Singapore) Pte. Ltd., Singapore (SG)

( * ) Notice: Subject to any disclaimer, the term of this patent is extended or adjusted under 35 U.S.C. 154(b) by 43 days.

(21) Appl. No.: 17/717,637

(22) Filed: Apr. 11, 2022

(65) Prior Publication Data

US 2022/0335055 A1    Oct. 20, 2022

(30) Foreign Application Priority Data

Apr. 15, 2021    (TW) .................................. 110113601

(51) Int. Cl.
*G06F 16/25* (2019.01)
*G06F 9/54* (2006.01)

(52) U.S. Cl.
CPC ............ *G06F 16/258* (2019.01); *G06F 9/547* (2013.01)

(58) Field of Classification Search
None
See application file for complete search history.

(56) References Cited

U.S. PATENT DOCUMENTS

| 2012/0303758 | A1* | 11/2012 | Anbarasan | .......... | H04L 41/0266 709/218 |
| 2016/0239370 | A1* | 8/2016 | Chen | .................... | G06F 11/0709 |
| 2019/0050351 | A1* | 2/2019 | Sahu | ....................... | G06F 3/0604 |

* cited by examiner

*Primary Examiner* — Syed A Roni
(74) *Attorney, Agent, or Firm* — Young Basile Hanlon & MacFarlane, P.C.

(57) ABSTRACT

A method for accessing Redfish data that is compliant with Redfish® specification, and that is stored in a board baseboard management controller (BMC) of a computer device is provided. The method includes: executing a unified extensible firmware interface (UEFI) application to transmit a data request to the BMC through a host interface using a representational state transfer (REST) protocol; when it is determined that Redfish data that corresponds with a URL included in the data request has been received, performing data transformation on the Redfish data to obtain transformed data; and generating and presenting the transformed data on a graphic interface.

16 Claims, 8 Drawing Sheets

METHOD FOR ACCESSING REDFISH DATA VIA A UNIFIED EXTENSIBLE FIRMWARE INTERFACE APPLICATION

CROSS-REFERENCE TO RELATED APPLICATION

This application claims priority of Taiwanese Patent Application No. 110113601, filed on Apr. 15, 2021.

FIELD

The disclosure relates to a method for accessing Redfish data via a unified extensible firmware interface application.

BACKGROUND

As the information technology progresses, organizations and institutes turn to large-scale solutions. In managing a data center that includes a large number of simple multi-node servers and/or a hybrid infrastructure, it is desirable to have a new standard as opposed to the conventional standards which are not sufficient for managing the operations of the data center.

The Redfish® published by Distributed Management Task Force (DMTF) is "a standard designed to deliver simple and secure management for converged, hybrid IT and the Software Defined Data Center (SDDC)" as stated by DMTF. Under the Redfish® standard, when it is desired to access Redfish data (i.e., data that is compliant with the Redfish® specification) in a baseboard management controller (BMC), two different ways are available: using a remote device that accesses the Redfish data via a communication network in an out-of-band (OOB) manner; or operating a local operating system (OS) to access the Redfish data via a host interface in an in-band manner.

SUMMARY

Therefore, an object of the disclosure is to provide a method for accessing Redfish data via a unified extensible firmware interface application.

According to one embodiment of the disclosure, the method is for accessing Redfish data that is compliant with Redfish® specification. The Redfish data is stored in a board management controller (BMC) of a computer device. The method is implemented using a processor of the computer device and includes:

A) executing a unified extensible firmware interface (UEFI) application to transmit a primary data request to the BMC through a host interface using a representational state transfer (REST) protocol, the data request including a uniform resource locator (URL) associated with the Redfish data to be accessed;

B) determining whether Redfish data that corresponds with the URL included in the primary data request has been received;

C) when it is determined that Redfish data that corresponds with the URL included in the primary data request has been received, performing data transformation on the Redfish data to obtain transformed data; and D) generating a graphic interface and presenting the transformed data on the graphic interface.

Another object of the disclosure is to provide a non-transitory computer-readable storage medium that stores a unified extensible firmware interface (UEFI) application therein, the UEFI application includes instructions that, when executed by a processor of a computer device, cause the processor to perform the steps of the above-mentioned method.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
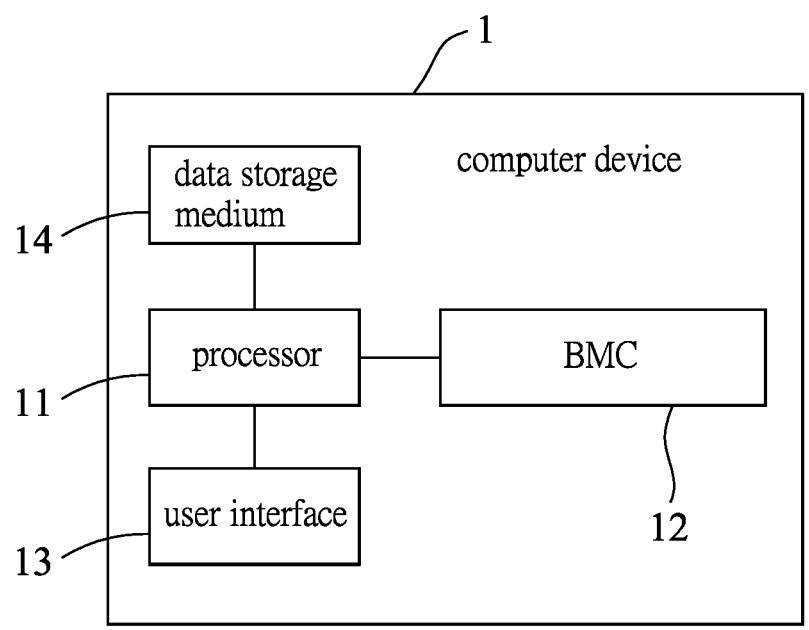
FIG. 1 is a block diagram of a computer device according to one embodiment of the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Throughout the disclosure, the term "coupled to" or "connected to" may refer to a direct connection among a plurality of electrical apparatus/devices/equipment via an electrically conductive material (e.g., an electrical wire), or an indirect connection between two electrical apparatus/devices/equipment via another one or more apparatus/devices/equipment, or wireless communication.

FIG. 1 is a block diagram of a computer device 1 according to one embodiment of the disclosure. The computer device 1 may be embodied using a personal computer, a server, or other similar computing devices. The computer device 1 includes a processor 11, a baseboard management controller (BMC) 12 electrically connected to the processor 11, a user interface 13 connected to the processor 11, and a data storage medium 14 connected to the processor 11.

The processor 11 may be embodied using a center processing unit (CPU), a microprocessor, a microcontroller, a single core processor, a multi-core processor, a dual-core mobile processor, a microprocessor, a microcontroller, a digital signal processor (DSP), a field-programmable gate array (FPGA), an application specific integrated circuit (ASIC), a radio-frequency integrated circuit (RFIC), and/or etc.

The BMC 12 in this embodiment stores Redfish data therein. Throughout the disclosure, the term "Redfish data" refers to data that is compliant with the Redfish® standard.

The user interface 13 includes, for example, a keyboard mouse combo and a display screen. In some embodiments, the user interface 13 may include a touchscreen.

The data storage medium 14 may be embodied using, for example, random access memory (RAM), read only memory (ROM), programmable ROM (PROM), firmware, flash memory, etc. In this embodiment, the data storage medium 14 stores a unified extensible firmware interface (UEFI) application therein. The UEFI application includes instructions that, when executed by the processor 11, cause the processor 11 to implement the operations as described below.

In use, there exists a demand for accessing the Redfish data stored in the BMC 12. According to some embodiments of this disclosure, there is provided a method for accessing Redfish data via the UEFI application.

According to one embodiment of the disclosure, the method includes a data access process, a data reading process, a data posting process and a data patching process. The method may be implemented by the processor 11 of the computer device 1 as shown in FIG. 1 executing the UEFI application. Each of the processes of the method may be initiated by a user operating the user interface 13 to control the processor 11 to execute the UEFI application.

Figure 2:
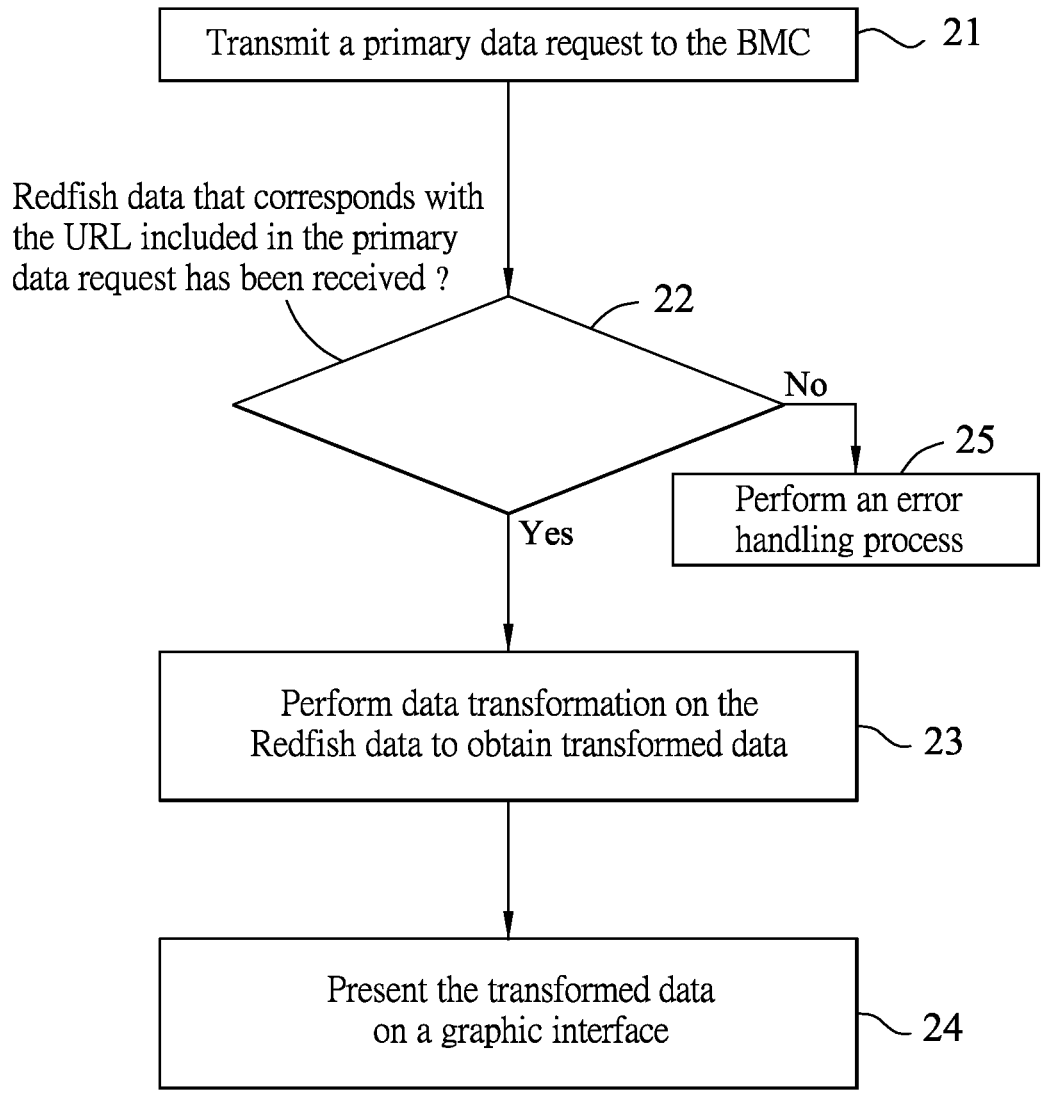
FIG. 2 is a flow chart illustrating steps of a data access process of a method for accessing Redfish data via a unified extensible firmware interface application according to one embodiment of the disclosure.

FIG. 2 is a flow chart illustrating steps of the data access process of the method according to one embodiment of the disclosure.

In step 21, the processor 11 executes the UEFI application, and transmits a primary data request to the BMC 12, through a host interface between the processor 11 and the BMC 12, using a protocol for constraints defined by Representational State Transfer (REST) (e.g., the hypertext transfer protocol (HTTP)). Hereinafter, such a protocol is referred to as "REST protocol". It is noted that, after executing the UEFI application, the processor 11 is said to enter a UEFI mode.

The data request includes a uniform resource locator (URL) associated with the Redfish data to be accessed. That is to say, the URL specifies a location of the Redfish data. The URL may be inputted manually by the user operating the user interface 13, or may be obtained in other ways. In this embodiment, the host interface may be a local area network (LAN) over an universal serial bus (USB) interface, but is not limited as such.

Upon receiving the primary data request, the BMC 12 transmits the Redfish data to the processor 11. In step 22, the processor 11 determines whether Redfish data that corresponds with the URL included in the primary data request has been received. Specifically, the processor 11 determines whether Redfish data has been received from the BMC 12, and then determines whether the received Redfish data corresponds with the URL included in the primary data request. In this embodiment, the Redfish data transmitted from the BMC 12 is represented in a JavaScript object notation (JSON) format, and the processor 11 may also determine whether the Redfish data is in such a format.

When the determination made in step 22 is affirmative (i.e., Redfish data that corresponds with the URL included in the primary data request has been received), the flow proceeds to step 23. Otherwise, the flow proceeds to step 25.

When it is determined that Redfish data that corresponds with the URL included in the primary data request has been received, in step 23, the processor 11 performs data transformation on the Redfish data to obtain transformed data. Specifically, in this embodiment, the data transformation includes adding at least one newline character (e.g., \n, \r\n, etc.) to the Redfish data to obtain the transformed data.

In step 24, the processor 11 generates a graphic interface, and controls the user interface 13 to present the transformed data on the graphic interface (e.g., controlling the display screen to display the graphic interface with the transformed data).

Figure 6:
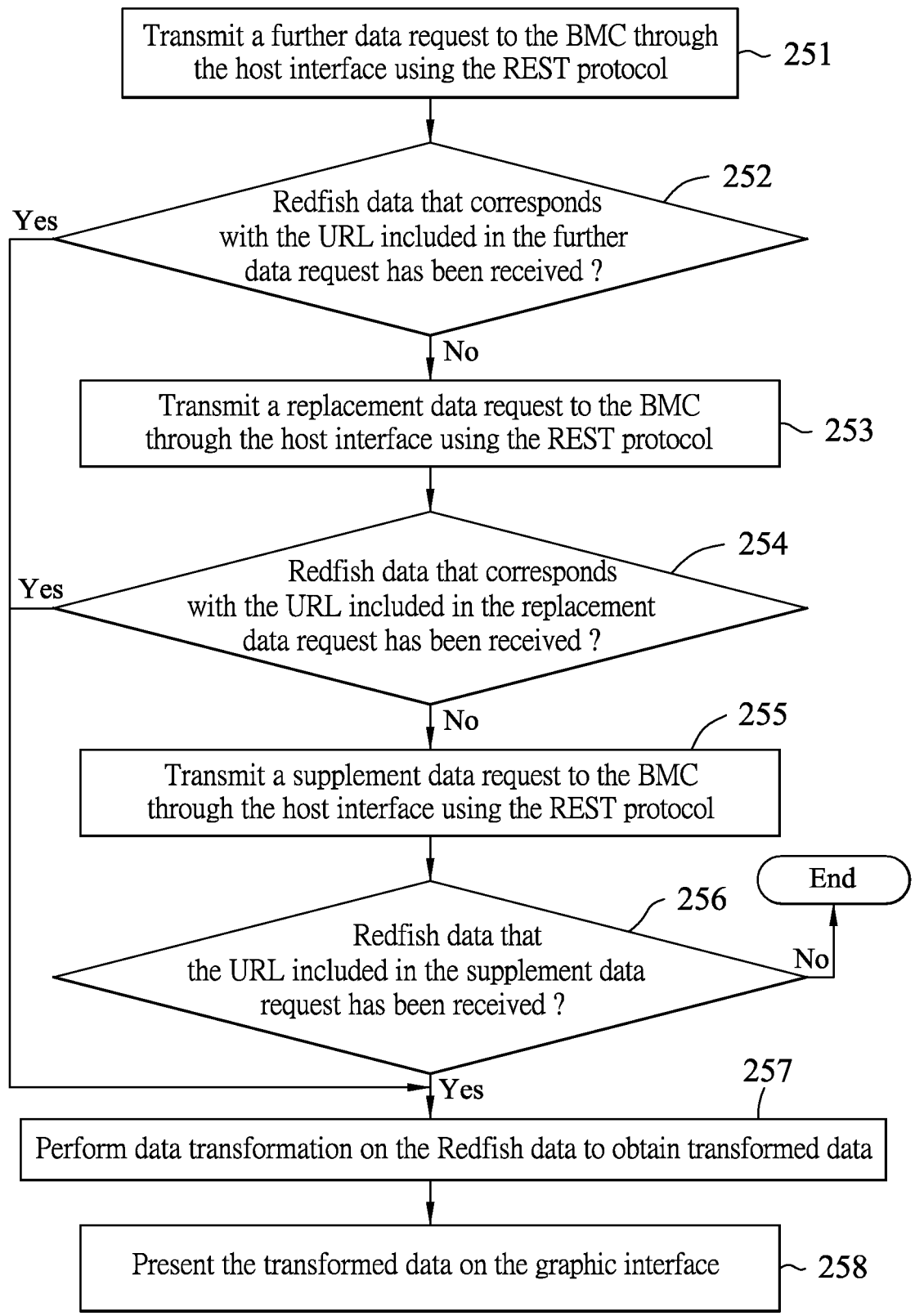
FIG. 6 is a flow chart illustrating sub-steps of an exemplary error handling process according to one embodiment of the disclosure.

In step 25, the processor 11 performs an error handling process. Specifically, FIG. 6 is a flow chart illustrating sub-steps of an exemplary error handling process according to one embodiment of the disclosure.

In sub-step 251, the processor 11 generates and transmits a further data request to the BMC 12 through the host interface using the REST protocol. The further data request includes the URL associated with the Redfish data to be accessed. Effectively, the operations of sub-step 251 are to resend the primary data request, which was sent to the BMC 12 is step 21, to the BMC 12.

In sub-step 252, the processor 11 determines whether Redfish data that corresponds with the URL included in the further data request has been received. When such a determination is affirmative, the flow proceeds to sub-step 257. Otherwise (that is, when it is determined that no Redfish data that corresponds with the URL included in the further data request has been received), the flow proceeds to sub-step 253.

In sub-step 253, the processor 11 transmits a replacement data request to the BMC 12 through the host interface using the REST protocol. The replacement data request includes a previous URL associated with a previous successful access of Redfish data.

In sub-step 254, the processor 11 determines whether Redfish data that corresponds with the URL included in the replacement data request has been received. When such a determination is affirmative, the flow proceeds to sub-step 257. Otherwise (that is, when it is determined that no Redfish data that corresponds with the URL included in the replacement data request has been received), the flow proceeds to sub-step 255.

In sub-step 255, the processor 11 transmits a supplement data request to the BMC 12 through the host interface using the REST protocol. The supplement data request includes a URL associated with Redfish data stored in a root directory of the computer device 1 (i.e., the URL specifies a root directory having the Redfish data).

In sub-step 256, the processor 11 determines whether the Redfish data that corresponds with the URL included in the supplement data request has been received. When such a determination is affirmative, the flow proceeds to sub-step 257. Otherwise (that is, when it is determined that no Redfish data that corresponds with the URL included in the supplement data request has been received), the processor 11 may determine that an error is present in the accessing of Redfish data using the REST protocol, and may generate an error message on the graphic interface for notifying the user, and the method is terminated.

In sub-step 257, the processor 11 performs data transformation on the Redfish data received from the BMC 12 to obtain transformed data. Specifically, in this embodiment, the data transformation includes adding at least one newline character (e.g., \n, \r\n, etc.) to the Redfish data to obtain the transformed data. It is noted that the operations of sub-step 257 may be similar to those described in step 23.

Then, in sub-step 258, the processor 11 generates a graphic interface, and controls the user interface 13 to present the transformed data on the graphic interface (e.g., controlling the display screen to display the graphic interface with the transformed data).

At this stage, the data access process is completed, and the user is enabled to view the transformed data on the graphic interface.

In some embodiments, the UEFI application also provides a functionality that enables the user to implement other operations, some of which are operations to be performed with respect to the transformed data on the graphic interface.

Figure 3:
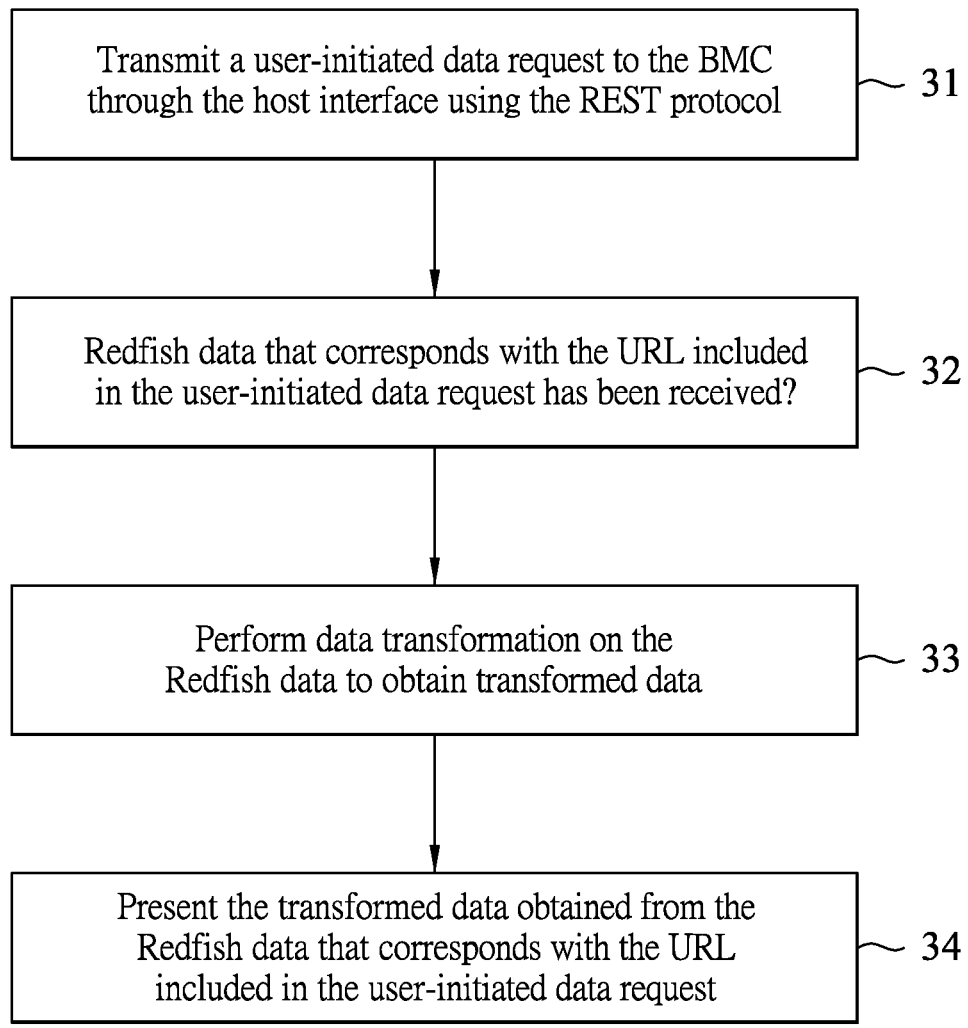
FIG. 3 is a flow chart illustrating steps of a data reading process of the method according to one embodiment of the disclosure.

FIG. 3 is a flow chart illustrating steps of the data reading process of the method according to one embodiment of the disclosure. This process may be initiated by the user operating the user interface 13, when the user intends to obtain other Redfish data that is associated with other URL(s). In this embodiment, the data reading process may be performed after the data access process is completed.

In step 31, the processor 11 transmits a user-initiated data request to the BMC 12 through the host interface using the REST protocol. The user-initiated data request includes a user-input URL associated with the Redfish data to be accessed. The user-input URL may be manually inputted by the user operating the graphic interface via the user interface 13.

Afterward, the processor 11 may be configured to perform operations similar to steps 22 to 24 as described above. Specifically, in step 32 (similar to step 22), the processor 11 determines whether Redfish data that corresponds with the URL included in the user-initiated data request has been received. When such a determination is affirmative, the flow proceeds to step 33 (similar to step 23), where the processor 11 performs data transformation on the Redfish data to obtain transformed data. Following step 33, in step 34 (similar to step 24), the processor 11 controls the user interface 13 to present, on a graphic interface, the transformed data obtained from the Redfish data that corresponds with the URL included in the user-initiated data request.

It is noted that when the determination of step 32 is negative, the processor 11 may also be configured to perform the error handling process as described in step 25.

In some embodiments, the UEFI application also provides a functionality that enables the user to implement operations with respect to the transformed data on the graphic interface.

Figure 4:
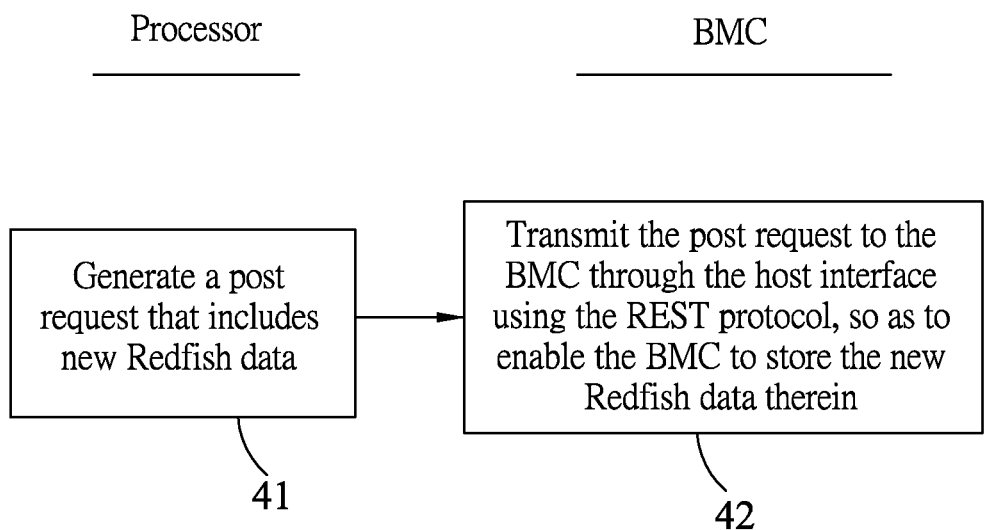
FIG. 4 is a flow chart illustrating steps of a data posting process of the method according to one embodiment of the disclosure.

FIG. 4 is a flow chart illustrating steps of the data posting process of the method according to one embodiment of the disclosure. This process may be initiated by the user operating the graphic interface via the user interface 13, when the user intends to add to the Redfish data to be stored in the BMC 12 (an operation also known as "post"). In this embodiment, the data posting process may be performed after the data access process is completed.

In step 41, in response to receipt of a user-input command to post new Redfish data via the graphic interface, the processor 11 generates a post request that includes the new Redfish data.

Figure 7:
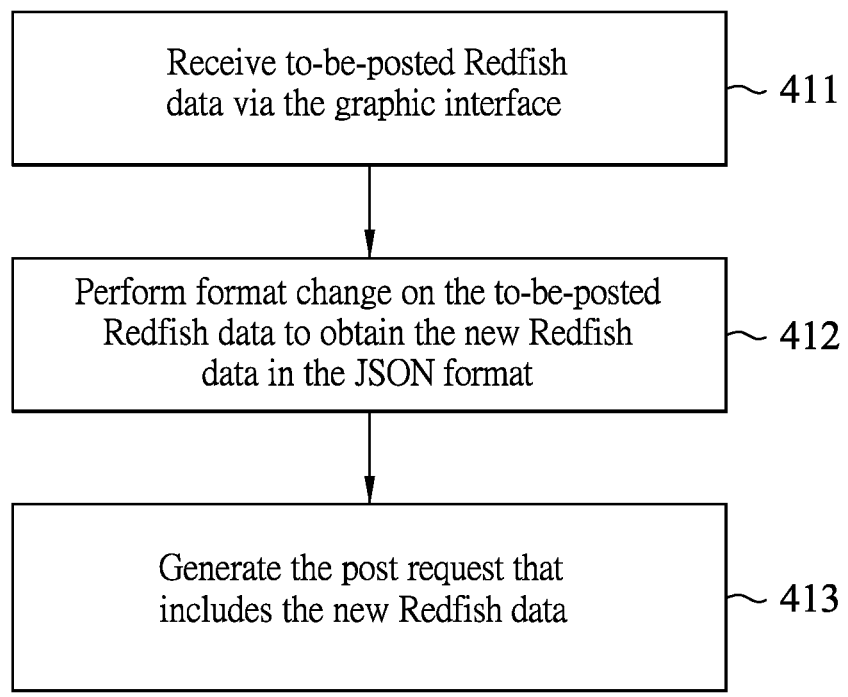
FIG. 7 is a flow chart illustrating sub-steps of the operations for generating a post request according to one embodiment of the disclosure.

Specifically, FIG. 7 is a flow chart illustrating sub-steps of the operations of step 41 according to one embodiment of the disclosure.

In sub-step 411, the processor 11 receives to-be-posted Redfish data via the graphic interface. That is to say, the user may operate the graphic interface to input the to-be-posted Redfish data.

In sub-step 412, the processor 11 performs a format change on the to-be-posted Redfish data to obtain the new Redfish data in the JSON format.

In sub-step 413, the processor 11 generates the post request that includes the new Redfish data.

Afterward, in step 42, the processor 11 transmits the post request to the BMC 12 through the host interface using the REST protocol, so as to enable the BMC 12 to store the new Redfish data therein.

Figure 5:
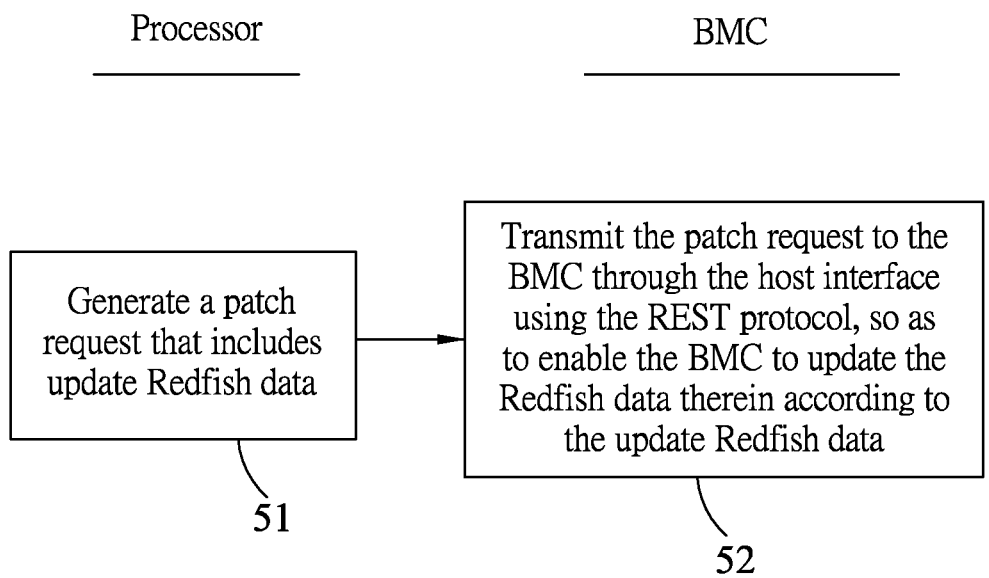
FIG. 5 is a flow chart illustrating steps of a data patching process of the method according to one embodiment of the disclosure.

FIG. 5 is a flow chart illustrating steps of the data patching process of the method according to one embodiment of the disclosure. This process may be initiated by the user operating the graphic interface via the user interface 13, when the user intends to update the Redfish data stored in the BMC 12 using update Redfish data (an operation also known as "patch"). In this embodiment, the data patching process may be performed after the data access process is completed.

In step 51, in response to receipt of a user-input command to patch the update Redfish data via the graphic interface, the processor 11 generates a patch request that includes the update Redfish data.

Figure 8:
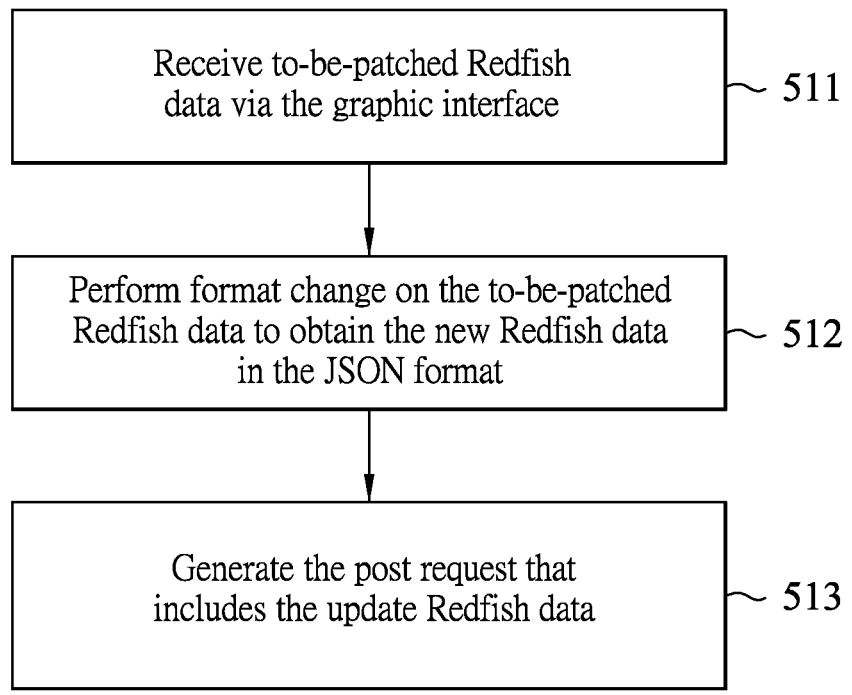
FIG. 8 is a flow chart illustrating sub-steps of the operations for generating a patch request according to one embodiment of the disclosure.

Specifically, FIG. 8 is a flow chart illustrating sub-steps of the operations of step 51 according to one embodiment of the disclosure.

In sub-step 511, the processor 11 receives to-be-patched Redfish data via the graphic interface. That is to say, the user may operate the graphic interface to input the to-be-patched Redfish data.

In sub-step 512, the processor 11 performs a format change on the to-be-patched Redfish data to obtain the update Redfish data in the JSON format. In sub-step 513, the processor 11 generates the patch request that includes the update Redfish data.

Afterward, in step 52, the processor transmits the patch request to the BMC 12 through the host interface using the REST protocol, so as to enable the BMC 12 to update the Redfish data therein according to the update Redfish data.

To sum up, the embodiments of the disclosure provide a method for accessing Redfish data via a UEFI application. In the method, the UEFI application enables a processor to transmit a data request to a BMC through a host interface using a REST protocol. Afterward, the requested Redfish data may be received by the processor and presented on a graphic interface, enabling the user to view the Redfish data and perform operations such as adding new Redfish data and updating the existing Redfish data. The method therefore serves as a new in-band manner to access the Redfish data stored in the BMC.

According to one embodiment of the disclosure, there is provided a non-transitory computer-readable storage medium that stores a unified extensible firmware interface (UEFI) application therein. The UEFI application includes instructions that, when executed by a processor of a computer device, cause the processor to: transmit a data request to a BMC of the computer device through a host interface using a representational state transfer (REST) protocol, the data request including a uniform resource locator (URL) associated with the Redfish data to be accessed; determining whether Redfish data that corresponds with the URL included in the data request has been received; when it is determined that Redfish data that corresponds with the URL included in the data request has been received, performing data transformation on the Redfish data to obtain transformed data; and generating a graphic interface and presenting the transformed data on the graphic interface.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A method for accessing data that is compliant with a defined format and specification, the data being stored in a baseboard management controller (BMC) of a computer device, the method being implemented using a processor of the computer device and comprising:
   A) executing a unified extensible firmware interface (UEFI) application to transmit a primary data request to the BMC through a host interface using a representational state transfer (REST) protocol, the data request including a uniform resource locator (URL) associated with the data to be accessed;
   B) determining whether data that corresponds with the URL included in the primary data request has been received;
   C) when it is determined that data that corresponds with the URL included in the primary data request has been received, performing data transformation on the data to obtain transformed data; and
   D) generating a graphic interface and presenting the transformed data on the graphic interface,
   wherein when the determination of step B is negative, performing an error handling process which includes:
      transmitting a further data request to the BMC through the host interface using the protocol, the further data request including the URL associated with the data to be accessed;
      determining whether data that corresponds with the URL included in the further data request has been received;
      when it is determined that no data that corresponds with the URL included in the further data request has been received, transmitting a replacement data request to the BMC through the host interface using the REST protocol, the replacement data request including a previous URL associated with a previous successful access of data;
      determining whether data that corresponds with the previous URL included in the replacement data request has been received;
      when it is determined that no data that corresponds with the URL included in the replacement data request has been received, transmitting a supplement data request to the BMC through the host interface using the REST protocol, the supplement data request including a URL associated with data stored in a root directory; and
      determining whether data that corresponds with the URL included in the supplement data request has been received.

2. The method of claim 1, wherein the host interface is a local area network (LAN) over universal serial bus (USB) interface.

3. The method of claim 1, wherein step B) includes determining whether the data received from the BMC corresponds with the URL included in the primary data request and further determining whether the data is in a defined object notation format.

4. The method of claim 1, wherein step C) includes adding at least one newline character to the data to obtain the transformed data.

5. The method of claim 1, wherein the error handling process further includes:
   when it is determined that data that corresponds with the root URL included in the supplement data request has been received, performing data transformation on the data to obtain transformed data, and controlling the user interface to present the transformed data on the graphic interface;
   when it is determined that no data that corresponds with the root URL included in the supplement data request has been received, generating an error message, and controlling the user interface to present the error message on the graphic interface.

6. The method of claim 1, further comprising, after step D), in response to receipt of a user-input URL via the graphic interface:
   using the UEFI application, transmitting a user-initiated data request to the BMC through the host interface using the REST protocol, the user-initiated data request including a user-input URL associated with the data to be accessed;
   determining whether data that corresponds with the URL included in the user-initiated data request has been received;
   when it is determined that data that corresponds with the URL included in the user-initiated data request has been received, performing data transformation on the data to obtain transformed data; and
   presenting, on the graphic interface, the transformed data obtained from the data that corresponds with the URL included in the user-initiated data request.

7. The method of claim 1, further comprising, after step D), in response to receipt of a user-input command to post new data via the graphic interface:
   generating a post request that includes the new data; and
   transmitting the post request to the BMC through the host interface using the REST protocol, so as to enable the BMC to store the new data therein.

8. The method of claim 7, wherein the generating of the post request includes:
   receiving to-be-posted data via the graphic interface;
   performing a format change on the to-be-posted data to obtain the new data in a defined object notation format; and
   generating the post request that includes the new data.

9. The method of claim 1, further comprising, after step D), in response to receipt of a user-input command to patch update data via the graphic interface:
   generating a patch request that includes the update data; and transmitting the patch request to the BMC using the REST protocol through the host interface, so as to enable the BMC to update the data therein according to the update data.

10. The method of claim 9, wherein the generating of the patch request includes:
receiving to-be-patched data via the graphic interface;
performing a format change on the to-be-patched data to obtain the update data in a defined object notation format; and
generating the patch request that includes the update data.

11. A non-transitory computer-readable storage medium that stores a unified extensible firmware interface (UEFI) application therein, the UEFI application includes instructions that, when executed by a processor of a computer device, cause the processor to:
transmit a data request to a baseboard management controller (BMC) of the computer device through a host interface using a representational state transfer (REST) protocol, the data request including a uniform resource locator (URL) associated with data to be accessed;
determining whether data that corresponds with the URL included in the data request has been received;
when it is determined that data that corresponds with the URL included in the data request has been received, performing data transformation on the data to obtain transformed data; and
generating a graphic interface and presenting the transformed data on the graphic interface,
wherein when the determination of step B is negative, performing an error handling process which includes:
transmitting a further data request to the BMC through the host interface using the protocol, the further data request including the URL associated with the data to be accessed;
determining whether data that corresponds with the URL included in the further data request has been received;
when it is determined that no data that corresponds with the URL included in the further data request has been received, transmitting a replacement data request to the BMC through the host interface using the REST protocol, the replacement data request including a previous URL associated with a previous successful access of data;
determining whether data that corresponds with the previous URL included in the replacement data request has been received;
when it is determined that no data that corresponds with the URL included in the replacement data request has been received, transmitting a supplement data request to the BMC through the host interface using the REST protocol, the supplement data request including a URL associated with data stored in a root directory; and
determining whether data that corresponds with the URL included in the supplement data request has been received.

12. A computer device comprising a processor and a baseboard management controller (BMC), said BMC storing data that is compliant with a defined format and specification therein, said processor being programmed to:
execute a unified extensible firmware interface (UEFI) application to transmit a primary data request to said BMC through a host interface using a representational state transfer (REST) protocol, the data request including a uniform resource locator (URL) associated with the data to be accessed;
determine whether data that corresponds with the URL included in the primary data request has been received;
when it is determined that data that corresponds with the URL included in the primary data request has been received, perform data transformation on the data to obtain transformed data; and
generate a graphic interface and present the transformed data on the graphic interface;
wherein the processor is programmed to perform an error handling process when it is determined that data that corresponds with the URL included in the primary data request has not been received, wherein the error handling process performed by the processor includes:
transmit a further data request to the BMC through the host interface using the REST protocol, the further data request including the URL associated with the data to be accessed;
determine whether data that corresponds with the URL included in the further data request has been received;
when it is determined that no data that corresponds with the URL included in the further data request has been received, transmit a replacement data request to the BMC through the host interface using the REST protocol, the replacement data request including a previous URL associated with a previous successful access of data;
determine whether data that corresponds with the previous URL included in the replacement data request has been received;
when it is determined that no data that corresponds with the URL included in the replacement data request has been received, transmit a supplement data request to the BMC through the host interface using the REST protocol, the supplement data request including a URL associated with data stored in a root directory; and
determine whether data that corresponds with the URL included in the supplement data request has been received.

13. The computer device of claim 12, wherein the host interface is a local area network (LAN) over universal serial bus (USB) interface.

14. The computer device of claim 12, wherein said processor is programmed to determine whether data that corresponds with the URL included in the primary data request has been received by determining whether the data received from the BMC corresponds with the URL included in the primary data request and further determining whether the data is in a defined object notation format.

15. The computer device of claim 12, wherein said processor is programmed to perform the data transformation by adding at least one newline character to the data to obtain transformed data.

16. The computer device of claim 12, wherein the error handling process performed by said processor further includes:
when it is determined that data that corresponds with the root URL included in the supplement data request has been received, performing data transformation on the data to obtain transformed data, and controlling the user interface to present the transformed data on the graphic interface;

when it is determined that no data that corresponds with the root URL included in the supplement data request has been received, generating an error message, and controlling the user interface to present the error message on the graphic interface.

* * * * *